United States Patent Office
3,466,150
Patented Sept. 9, 1969

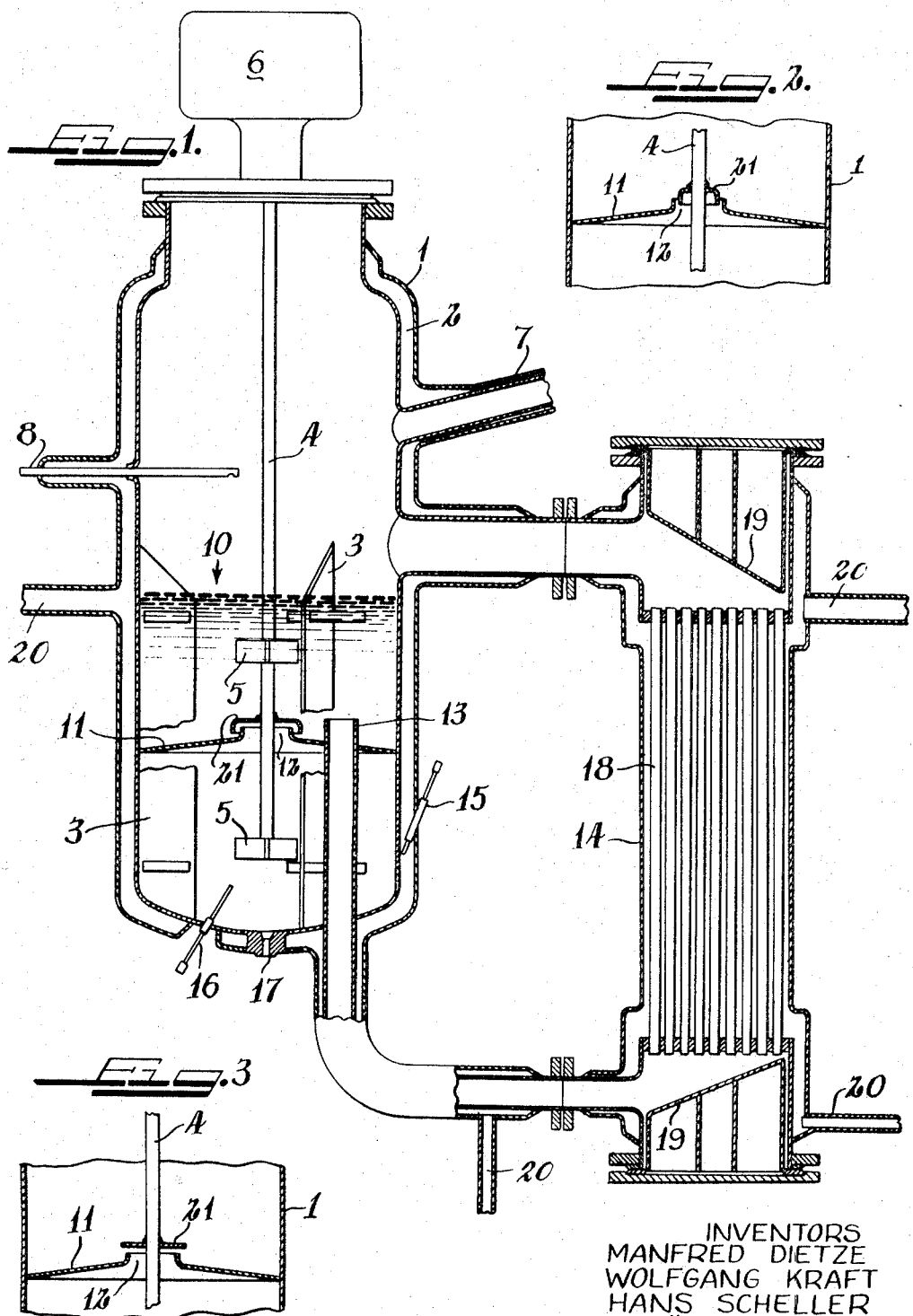

3,466,150
POLYCONDENSATION REACTOR
Manfred Dietze, Offenbach am Main, Wolfgang Kraft, Bad Vilbel, Hans Scheller, Schonberg, Taunus, and Hansjürgen Ullrich, Frankfurt am Main, Germany, assignors to Vickers-Zimmer Aktiengesellschaft, Planung und Bau von Industrieanlagen, Frankfurt am Main, Germany, a corporation of Germany
Filed June 1, 1965, Ser. No. 460,258
Int. Cl. B01j 1/00; C08g 41/00
U.S. Cl. 23—285                                8 Claims

ABSTRACT OF THE DISCLOSURE

Polycondensation apparatus for the making of polyesters or polyamides such as polyethylene terephthalate or nylon, particularly nylon 66. The first stage polycondensation apparatus comprises a vertical reaction vessel of cylindrical configuration in combination with an external heat exchanger, the reaction vessel and exchanger being jacketed for temperature control. Precondensate pumped from a transesterification reaction is recycled between the reaction vessel and heat exchanger and is agitated in the vessel while ethylene glycol vapor is removed therefrom through an outlet communicating with a source of reduced pressure. Polycondensate product is drawn off at the bottom of the vessel at a rate substantially less than the vessel-heat exchanger re-cycle rate.

---

This invention relates to apparatus and method for effecting polycondensation to make polyesters or polyamides such as polyethylene terephthalate or nylon, particularly nylon 66. In particular the invention relates to apparatus and method for effecting the first stage of polycondensation in a polymerization process involving a plurality of condensation stages.

In making polyesters and polyamides for spinning or forming into solid objects, it is essential that the final polymer material prior to spinning or molding be of uniform viscosity and composition. It is thus essential that the processes by which the polymers are made be easily and precisely controlled.

There is described in co-pending application Ser. No. 460,499, filed June 1, 1965, a continuous process for making polyester, in particular polyethylene terephthalate. Therein ethylene glycol is reacted with dimethylterephthalate to produce by transesterification reaction bis-2-hydroxy-ethyl terephthalate. The terephthalate transesterification product is fed into a series of polycondensation reactors each of which effects polycondensation to a higher degree than the reactor preceding it and the reactors are operated at progressively higher temperatures and lower pressures. It is essential that each reactor in the series produce a polycondensate which is nearly uniform in viscosity and composition and that each reactor be easily and precisely controlled. Fluctuations in reaction parameters may result in products which produce unacceptable fibers, films, or cords. It is of particular importance that the first polycondensation reactor be precisely controlled since the performance of all subsequent reactors depends thereon.

It is thus an object of this invention to provide a process and apparatus for effecting the first stage of a plurality of stages of polycondensation of polyester or polyamide.

It is another object of this invention to provide a process and apparatus for making polyester or polyamide of nearly uniform viscosity and composition.

It is a further object of this invention to provide a first polycondensation reactor to be used in conjunction with a series of polycondensation reactors which first reactor may be easily and precisely controlled.

Other objects of the invention will become more apparent hereinafter as the invention is more fully described.

Basically, the apparatus of the invention comprises a vertical reaction vessel of generally cylindrical configuration and an external heat exchanger, the reaction vessel and exchanger being jacketed for temperature control. Precondensate pumped from the transesterification reaction is re-cycled between the reaction vessel and heat exchanger, the precondensate is agitated in the vessel while ethylene glycol vapor is removed therefrom through an outlet communicating with a source of reduced pressure, and polycondensate product is drawn off at the bottom of the vessel at a rate substantially less than the vessel-heat exchanger re-cycle rate hereinafter described. The product polycondensate is then fed to a second reactor where further condensation occurs. Such reactor is described in co-pending application Ser. No. 460,174, filed June 1, 1965.

The invention will be better understood by reference to the drawing wherein:

FIG. 1 is a side view, partially in section, of one embodiment of the invention;

FIG. 2 is a detailed view of an alternative embodiment of the horizontal plate and stirring means of the invention; and FIG. 3 is a detailed view of another alternative embodiment of the horizontal plate and stirring means.

FIG. 1, the reactor vessel shown generally at 1 is of cylindrical configuration, is vertically oriented and is jacketed to provide a space 2 surrounding the vessel in which is maintained heating fluid such as liquid or vaporous diphenyl. Surrounding the inner periphery of the lower half of the reactor vessel 1 are a plurality of vertically oriented baffles 3 which are attached to vessel 1 by any conventional means, for example by welding. Extending vertically through the vessel 1 is a steering rod 4 to which is attached star-like impellers 5. Shaft 4 is driven by a motor 6 shown diagrammatically. The motor may be of any conventional kind. On the upper part of vessel 1 there is provided an outlet line 7 which is connected to a source of reduced pressure (not shown) whereby vapors of ethylene glycol are removed from vessel 1 and whereby vessel 1 is maintained at reduced pressure.

There is also provided on the vessel a tube 8 which communicates with the upper portion of vessel 1 through the wall thereof and through which liquid or powdered material such as catalyst or delustering agent may be added to vessel 1. Tube 8 also serves as the precondensate inlet line through which precondensate is fed into vessel 1 above the level at which liquid is maintained in the vessel.

Below the liquid level, shown at 10, there is provided a baffle plate 11 which has a central opening 12 through which stirring rod 4 protrudes. The opening 12 in plate 11 is sufficiently larger in diameter than rod 4 and the lower impeller 5, so that liquid material may flow through the annular space and so that stirring rod 4 with the lower impeller 5 can be inserted or removed from vessel 1 if desired after plate 11 is in place. To rod 4 is attached a disk 21 to cover opening 12, whereby an annular space between plate 11 and disk 21 is formed, which allows the liquid to flow from the upper part of the reactor to the lower part. As shown in FIG. 1, disk 21 is in the form of an inverted dish whose ends slightly overlap the outer upwardly protruding ends of plate 11. The embodiment of FIG. 2 shows disk 21 as being oriented internally of the hole 12 in plate 11. In FIG. 3 the disk is a flat plate spaced slightly above plate 11. Plate 11 may be horizontal but preferably it is slightly inclined as shown in the drawing to prevent accumulation of gas thereunder. Below liquid level 10 there is provided flow pipe 13 the end of which is above plate 11. Pipe 13 communicates through the bottom of vessel 1 with heat exchanger 14. Temperature indicating means 15 and 16, which may be any conventional type such as thermocouples, are provided to indicate the temperature in the jacket and in the lower part of vessel 1, respectively. At the bottom of vessel 1 is an exit port 17 through which polycondensation product is drawn.

Heat exchanger 14 comprises a plurality of vertically oriented tubes 18 which may be constructed of any conventional material, for example copper or steel. The tubes are surrounded by heat exchange fluid which also communicates with the jacket which surrounds the entrance and exit portions of the heat exchanger. At the upper and lower parts of heat exchanger 14, there are baffle plates 19 which direct the flow of fluid up through tubes 18. Heat exchange fluid which may be liquid or vaporous diphenyl is circulated by pumping into and out of the exchanger vessel through connections 20.

In operation, precondensate material such as bis-2-hydroxy-ethyl terephthalate, produced in a transesterification reactor, is pumped through inlet line 8 into reaction vessel 1. Stirrer 4 agitates the liquid mass while baffle plates 3 break up the horizontal movement of material. Liquid level is maintained as shown at 10 in vessel 1. In operation liquid material fills flow pipe 13 and runs into heat exchanger 14. The liquid level in heat exchanger 14 is maintained slightly higher than the level in vessel 1 as shown in the drawing so that material flows from the top of exchanger 14 into vessel 1 by the syphon effect. Product is drawn out of vessel 1 through outlet 17.

Stirring means 5 constantly agitates the reacting material as it circulates between the reaction vessel and the heat exchanger. Polycondensate product is drawn off at the bottom of the chamber for transporting to the second polycondensation reactor and ethylene glycol is removed as vapor through outlet 7. The ratio of re-cycle-to-product draw-off is preferably between 10:1 and 20:1. By varying the re-cycle ratio, reactor residence time is controlled. Such time may vary from 1 to 4 hours, preferably about 3 hours.

By means of the jacketed chamber 2 and the heat exchanger 14, the reactants are maintained between about 255 and 270° C. By means of the source of reduced pressure communicating with outlet 7, ethylene glycol is continuously removed from the reactor 1 and the reactor pressure is maintained from 20 to 200 torr, preferably between 50 to 100 torr.

The following non-limiting examples illustrate the process of the invention.

Example I

Into a reactor vessel as described and shown in FIG. 1 was fed 172 kilograms per hour of bis-2-hydroxy-ethyl terephtalate, a product of the transesterification reaction of ethylene glycol and dimethylterephthalate in the presence of zinc acetate as catalyst in quantity 0.056% by weight of dimethylterephthalate. The precondensate had a degree of polymerization of 1.5. In the heat jacket of the vessel was maintained Dowtherm at 265° C. Vessel pressure was maintained at 100 torr and the volume of liquid in the vessel was maintained at 480 liters. The stirrer was rotated at 150 r.p.m. throughout the reaction.

To the vessel was added as polycondensation catalyst antimony trioxide in quantity 0.04% by weight of dimethylterephthalate starting material. Also added as inhibitor for the zinc acetate still present in the mixture was trinonylphenylphosphite in quantity 0.1% by weight of dimethylterephthalate. Precondensate was re-cycled through the heat exchanger at a ratio of 10 parts re-cycled to 1 part of product withdrawn. Ethylene glycol was removed as vapor from the vessel at a rate of 37 kilograms per hour. Precondensate product at a temperature of 260° C. was withdrawn from the vessel at the rate of 135 kilograms per hour. Product viscosity ($\eta_{\text{intr}}$) was about 0.14. Average density of the product was 1.17 kilograms per liter.

Example II

Into a reactor vessel as described and shown in FIG. 1 was fed 5 kilograms per hour of bis-2-hydroxy-ethyl terephthalate, a product of the transesterification reaction of ethylene glycol and dimethylterephthalate with catalyst as described in Example I. The precondensate had a degree of polymerization of 2.0. In the heat jacket of the vessel was maintained Dowtherm at 270° C. Vessel pressure was maintained at 50 torr and the volume of liquid in the vessel was maintained at 18 liters. The stirrer was rotated at 150 r.p.m. throughout the reaction.

To the vessel was added antimony trioxide and trinonylphenylphosphite and described in Example I. Precondensate was re-cycled through the heat exchanger at a ratio of 20 parts re-cycled to 1 part of the product withdrawn. Ethylene glycol was removed as vapor from the vessel at a rate of 0.7 kilogram per hour. Precondensate product at a temperature of 265° C. was withdrawn from the vessel at the rate of 4.3 kilograms per hour. Product viscosity ($\eta_{\text{intr}}$) was about 0.18. Average density of the product was 1.17 kilograms per liter.

As can be seen, the apparatus and method of this invention provides a simple and easy means for effecting polycondensation of precondensates. What has heretofore been described is but one embodiment of the invention which is non-limitative, the scope of the invention being defined by the following claims.

We claim:

1. Apparatus for polymerizing liquid precondensate comprising a reaction vessel having an upper and lower section, a vertically oriented heat exchanger having upper and lower fluid inlets, said upper inlet communicating with the upper section of said vessel, said lower inlet communicating with the lower section of said vessel, means in the lower section of said vessel dividing said lower section into two vertically disposed sub-sections and having a central aperture for communication between said sub-sections, a pipe in said lower section with one terminus communicating with the uppermost vertically disposed sub-section and the other terminus communicating with the lower fluid inlet of said heat exchanger, means in said upper section for feeding liquid to said vessel, means in said upper section for withdrawing vapors under reduced pressure, means in said lower section for withdrawing liquid from said vessel and means in said lower section for agitating liquid therein.

2. Apparatus of claim 1 further comprising a plurality of vertical baffles arranged along the internal periphery of the lower section of said vessel.

3. Apparatus of claim 1 wherein said means for dividing the lower section of said vessel into two vertically disposed subsections comprises a plate inclined to the horizontal.

4. Apparatus of claim 3 wherein said agitating means includes a vertical rod.

5. Apparatus of claim 1 wherein said vessel is jacketed for heating by heating fluid.

6. Apparatus for polymerizing liquid precondensate comprising a reaction chamber, inlet means for feeding precondensate to said chamber, outlet means for withdrawing product from said chamber, a plurality of generally vertical baffle plates along the periphery of said chamber, stirring means including a vertically oriented rod adapted to agitate precondensate in said chamber, a plate inclined to horizontal in the lower portion of said chamber having a hole of larger diameter than said rod, a heat exchanger communicating with said chamber for re-cycle of precondensate between said chamber and said heat exchanger, means communicating with said reaction chamber for withdrawing vapors under reduced pressure and a pipe terminating above said inclined plate in said chamber and communicating with the lower terminus of said heat exchanger.

7. Apparatus of claim 6 wherein said stirring rod has secured thereto a horizontally disposed plate arranged in spaced relation to the periphery of said hole to provide an annular space for fluid flow between upper and lower portions of said chamber.

8. Apparatus of claim 6 wherein the diameter of said stirring means is less than the diameter of said hole thereby to facilitate removal of said stirring means from said vessel.

References Cited

UNITED STATES PATENTS

| 1,138,595 | 5/1915 | Stanton et al. | 23—285 XR |
|-----------|--------|----------------|-----------|
| 2,917,372 | 12/1959 | Wallin | 23—285 |
| 3,129,066 | 4/1964 | Ambrogi et al. | 23—285 XR |

MORRIS O. WOLK, Primary Examiner

M. D. BURNS, Assistant Examiner

U.S. Cl. X.R.

23—252, 288; 260—75